Patented Nov. 12, 1940

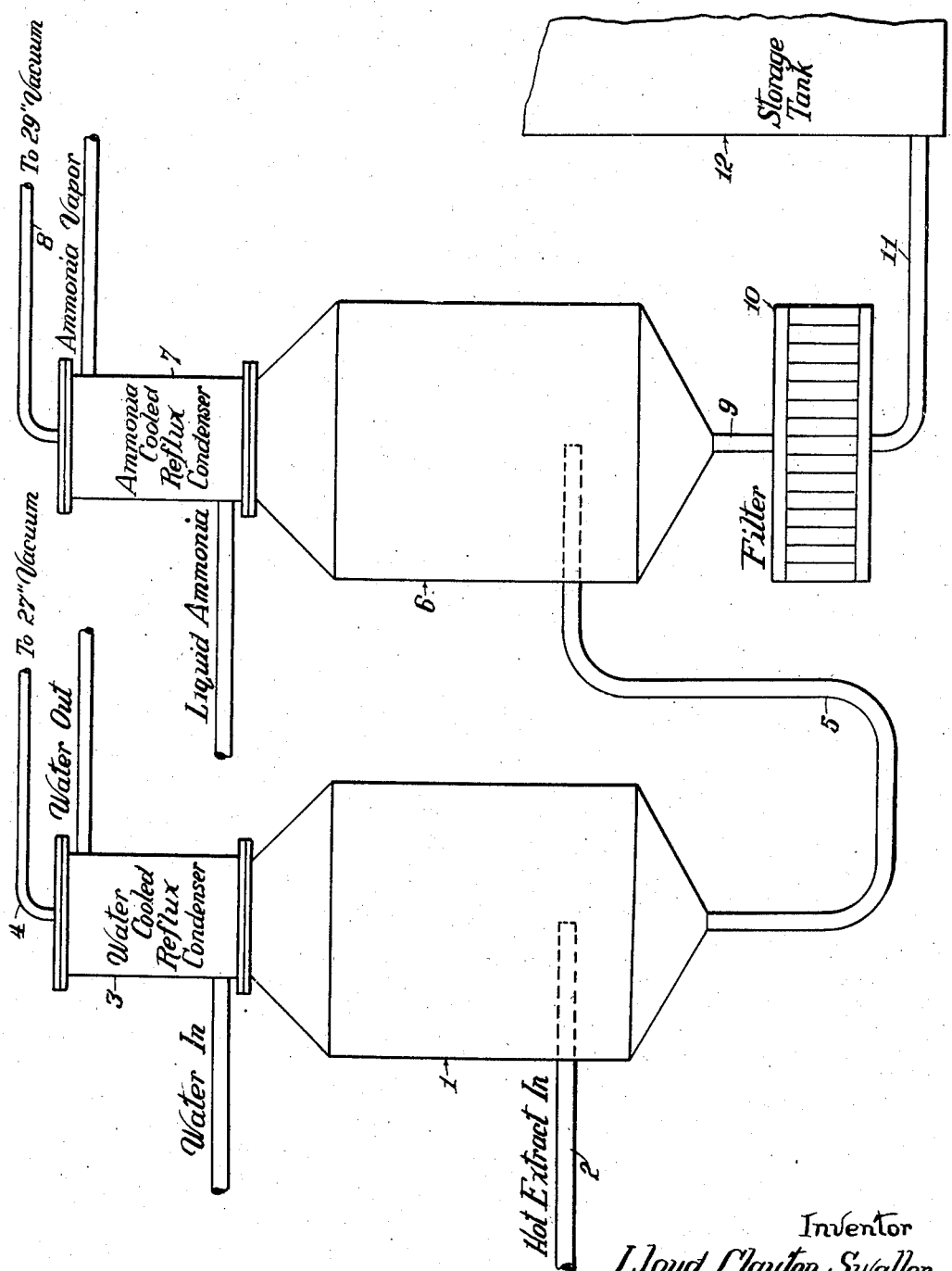

2,221,561

UNITED STATES PATENT OFFICE 2,221,561

STABILIZATION OF A ZEIN SOLUTION BY CLARIFICATION

Lloyd C. Swallen, Argo, Ill., assignor to Corn Products Refining Company, New York, N. Y., a corporation of New Jersey Application January 13, 1940, Serial No. 313,671

9 Claims. (Cl. 134—12)

This invention relates to the production of zein; and the object of the invention is to provide a treatment of the zein in alcoholic solution whereby the stability of the solution will be substantially increased; that is to say, whereby the tendency of the zein in solution to become denatured, that is, insoluble, will be to a large extent counter-acted, permitting the solution to be kept in a useable state for a much more prolonged period of time than has heretofore been possible.

The invention is based upon the discovery that the known tendency for zein in solution to become gradually insoluble in character, so that a solution of zein if left to stand will become a gel in a relatively brief time, is due to the presence in the solution of insoluble bodies such as denatured zein, or other protein substances, which act, probably catalytically, to insolubilize the soluble zein. These insoluble substances are present or develop to some extent in all extracts produced by present methods, and are not removed, or at least completely removed, by the ordinary methods of clarification by filtering now used, which methods are intended, as a matter of fact, merely to separate from the solution particles of gluten meal carried over from the extracting apparatus. The ordinary expedient, that is, of filtering the extract is not intended to, nor does it to any considerable extent, remove the insoluble zein bodies, or other protein substances which, as applicant has discovered, bring about the insolubilizing of the zein in solution; the ordinary clarification method having been carried out in ignorance of the fact discovered by applicant, and which is the basis of the present invention, that there are other bodies of an insoluble or colloidal character besides the residual gluten meal which if allowed to remain in the solution, denature the soluble zein in such solution. Zein solutions containing these denatured zein or other protein bodies will set up to a gel quite rapidly; the time required being dependent on the strength and nature of the alcohol, or other solvent of the zein, and upon the concentration of the solution, the temperature, the hydrogen ion concentration and upon mechanical factors promoting the denaturing operation, such agitation. But under any set of conditions the time within which the solution will change to a gel will be very considerably increased by the substantially complete removal from the solution of the insoluble protein bodies which it contains, in accordance with the principles of the present invention.

A practical method of extracting zein from the protein component of maize is to use as a solvent ethyl alcohol of 92%–93% concentration by volume, which concentration may be varied between 88% or lower and 95%, and to carry on the extraction in a rotating drum with an agitator at a temperature of 60° C. for one and a half to two hours. A suitable amount of alkali, say 0.9% sodium hydroxide based on the weight of the gluten meal may be added to the material in the drum. The extracted zein will be in the neighborhood of 4.5–6.5 grams to 100 cubic centimeters of the solvent. The meal is then centrifuged and washed with alcohol, giving a zein concentration in the extract of 6 grams per 100 cubic centimeters, which may vary between 4 and 6 grams, dependent upon the strength of the alcohol, the character of the gluten and the proportion of alcohol to gluten meal.

The extraction may be carried out also with isopropyl alcohol, instead of ethyl alcohol, of from 82% to 87% concentration, at a temperature of 60° C. (140° F.) for 1.5 to 2 hours. The extract will contain per 100 cubic centimeters about 6 grams of zein. Such process is disclosed in copending application of the applicant, filed November 14, 1938, Serial No. 240,307.

A zein extract obtained by either of the above methods, or by any other method of extraction, or a solution made by dissolving dried zein in aqueous alcohol or other solvent, is subjected, in accordance with the present invention, to a rapid cooling operation for the coagulation and precipitation of denatured zein and other insoluble or colloidal protein bodies in the solution, and the solution is then treated by filtration or settling for the removal of such precipitated matter.

The temperature to which the solution is cooled should, for most effective operation of the process, be as low as possible without bringing about the separation of the extract into two liquid phases.

In treating zein produced by the isopropyl alcohol method referred to above, the extracts appear to separate into two phases at 10° C. (50° F.) or slightly higher. Therefore the cooling should not be carried, for an extract of this character, quite down to 10° C. A workable temperature is 15° C. (59° F.) or slightly lower. Increased stability of the solution is obtained by cooling to 20° C. (68° F.), but the solution cooled to this temperature is distinctly less stable than a solution cooled to 15°–10° C.

No definite temperature range can be given applicable to all solutions as the point of separation of the solution into two liquid phases will depend to some extent upon the zein concentration, the concentration of the alcohol, or the solvent, the kind of solvent used and other factors. To obtain the best results, in respect to stability, the rule is to cool to the lowest possible temperature without bringing about the separation of the solution into two liquid phases, that is, without bringing about the stratification of the solution.

Preferably the stabilizing treatment precedes oil and color removal.

A suitable apparatus for practicing the process is illustrated, diagrammatically, in the accompanying drawing.

This apparatus consists of two cooling units through which the extract passes successively. A single unit might be used. The two unit system is preferable because part of the cooling may be done with water as a cooling agent, thus reducing the amount of artificial refrigeration required.

Referring to the drawing, 1 designates a cooling unit to which the hot extract from the extracting apparatus is delivered through pipe 2. The vessel is provided with a water cooled reflux condenser 3 and subjected to a vacuum of 27 inches of mercury, the pipe leading to the vacuum pump (not shown) being designated 4. The solution in vessel 1 is reduced to a temperature of about 30° C. (86° F.) and then passes through pipe 5 to a second cooling vessel 6 provided with an ammonia cooled reflux condenser 7 in which the pressure is reduced to a 29 inch vacuum, the pipe leading to the vacuum pump (not shown) being designated 8. The solution in vessel 2 being reduced to a temperature of about 15° C. (59° F.), or slightly lower, passes through pipe 9 to a filter 10 or other apparatus for separating the coagulated and precipitated impurities from the solution, which latter go through pipe 11 to storage vessel 12.

It is obvious that the apparatus shown and described is only one particular type of apparatus which may be used for producing the cooling of the solution. A double pipe heat exchanger might be employed if desired. The chief advantage of the preferred form of cooling apparatus, shown in the drawing, is that there are no heat transfer surfaces likely to become coated with the material treated as is the case with the ordinary heat transfer apparatuses.

The intention is to cover by patent all equivalents and all modifications of process and apparatus within the scope of the appended claims.

This application is a continuation in part of applicant's pending application Serial No. 155,691, filed July 26, 1937, for "Stabilization of zein by clarification."

I claim:

1. Treatment of an alcoholic zein solution to stabilize it which comprises: cooling the solution to a temperature above that at which the solution separates into two liquid phases whereby protein bodies are precipitated which, if allowed to remain in the solution, denaturize soluble zein; and removing such bodies from the solution.

2. Treatment of an alcoholic zein solution to stabilize it which comprises: cooling the solution to a temperature between 20° and 10° C. (68° and 40° F.) to precipitate protein bodies which, if allowed to remain in the solution, denaturize soluble zein; and removing such bodies from the solution.

3. Treatment of an alcoholic zein solution to stabilize it which comprises: cooling the solution to a temperature of about 15° C. (59° F.) to precipitate protein bodies which, if allowed to remain in the solution, denaturize soluble zein; and removing such bodies from the solution.

4. Treatment of an alcoholic zein solution to stabilize it which comprises: cooling the solution under vacuum to a temperature above that at which the solution separates into two liquid phases whereby protein bodies are precipitated which, if allowed to remain in the solution, denaturize the soluble zein; and removing such bodies from the solution.

5. Treatment of an alcoholic zein solution to stabilize it which comprises: cooling the solution under vacuum at two stages in the latter of which the vacuum is increased, to a temperature above that at which the solution separates into two liquid phases whereby protein bodies are precipitated which, if allowed to remain in the solution, denaturize soluble zein; and removing such bodies from the solution.

6. In the production of zein: extracting the zein from corn gluten with an alcoholic solvent and heat; cooling the extract to a temperature which is above that at which the solution separates into two liquid phases; and removing precipitated protein bodies whereby the stability of the solution is increased.

7. In the production of zein: extracting the zein from corn gluten with an alcoholic solvent and the application of heat; cooling the extract to a temperature between 20° C. and 10° C. (68° and 40° F.); and removing precipitated protein bodies whereby the stability of the solution is increased.

8. In the production of zein: extracting the zein from corn gluten with an alcoholic solvent and the application of heat; cooling the extract in vacuo to a temperature above that at which the solution separates into two liquid phases; and removing precipitated protein bodies from the solution, whereby the stability of the solution is increased.

9. In the production of zein: extracting the zein from corn gluten with an alcoholic solvent and the application of heat; cooling the extract in vacuo to reduce it to a temperature between 20° and 10° C. (68° and 40° F.); and removing precipitated protein bodies from the solution whereby the stability of the solution is increased.

LLOYD C. SWALLEN.